Patented May 11, 1948

2,441,400

UNITED STATES PATENT OFFICE 2,441,400

ACETYLENE REMOVAL PROCESS

Thomas F. Doumani and Davis A. Skinner, Long Beach, Calif., assignors to Union Oil Company of California, Los Angeles, Calif., a corporation of California No Drawing. Application May 12, 1943, Serial No. 486,736

17 Claims. (Cl. 260—681.5)

This application relates to the separation of acetylenes from hydrocarbon mixtures and is especially concerned with the separation of vinyl acetylene and other acetylenes containing three and four carbon atoms from hydrocarbon mixtures containing diolefins or mixtures of mono-olefins and diolefins such as butenes and butadiene.

In the manufacture of butadiene, for example, for use in synthetic rubber production, the crude butadiene is generally associated with acetylenes and may also be associated with butenes and possibly butanes as well. The latter hydrocarbons are difficult to separate from the butadiene and from each other by fractional distillation because of the small differences in boiling points involved. Various other methods, such as solvent extraction, have been suggested for the separation of these hydrocarbons, but these methods while they are effective in separating the butanes and/or butenes from the butadiene, are generally not effective for separation of the butadiene and C4 acetylenes because of the similarity in the solubility characteristics of these latter two materials. This latter separation is extremely important, however, because the contamination of butadiene with acetylenes may cause marked differences in the polymerization characteristics of the butadiene. This has in some instances restricted the use of butadiene-containing gases to those of low acetylene content, in which the small amounts of acetylenes remaining after concentration of the butadiene may be destroyed by chemical treatment, without too much concurrent destruction of butadiene.

According to the present invention, acetylenes in relatively large or small concentrations may be separated from hydrocarbon mixtures containing other hydrocarbons such as diolefins, olefins and paraffins, substantially completely, without loss of such other hydrocarbons. Furthermore, the removed acetylenes, which are also of great value in the production of plastics and chemicals, may be readily recovered in relatively pure form. The removal is accomplished by contacting the hydrocarbon mixture with a specially prepared absorption solution. This results in the formation of solid metal-acetylene compounds or addition complexes which are insoluble both in the hydrocarbons and in the absorption solution employed, and are therefore readily removed therefrom as by settling or filtration. The parent acetylenes may then be regenerated from these solid acetylides by hydrolysis.

There is relatively little that is definitely known about the organo-metallic compounds or addition complexes of olefins and acetylenes and the data reported in the literature are sometimes conflicting and confusing. According to some of these reports, butadiene, certain acetylenes, and isobutylene will all form addition complexes with solid cuprous chloride. Furthermore, both vinyl acetylene and butadiene reportedly also will form addition complexes with cuprous ammonium chloride in aqueous solution. In these addition complexes the cuprous chloride and hydrocarbon are said to be combined in the ratio of 1 to 4 molecules of hydrocarbon to each molecule of cuprous chloride. Ammonia or water are also said to be present in some of these addition complexes. It has also been reported that acetylene reacts with aquous solutions of certain salts, such as cuprous ammonium chloride, to form acetylides according to the following reaction:

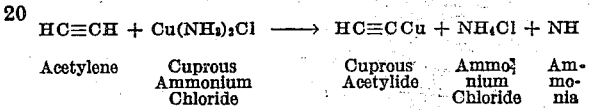

| Acetylene | Cuprous Ammonium Chloride | Cuprous Acetylide | Ammonium Chloride | Ammonia |

Both hydrogen atoms of the acetylene molecule may also react with metals such as calcium to form carbides of type $MC_2$.

It has now been discovered that under certain conditions, preferably in the presence of nitrogen base salts and nitrogen bases, acetylenes may be converted to acetylides without the occurrence of interfering addition complexes with other hydrocarbons such as mono-olefins and conjugated diolefins, and a process has now been devised whereby acetylenes including vinyl acetylene are selectively removed from hydrocarbon mixtures containing mono-olefins and diolefins and are subsequently recovered in substantially pure form. In one aspect the process of this invention involves reacting the hydrocarbon in batch or continuous operation in the liquid or vapor phase with an aqueous absorption solution of normally water-insoluble metal hydroxides such as cuprous hydroxide containing certain amounts of nitrogen base salts and nitrogen bases and/or water-soluble strong inorganic bases, whereby metal acetylides are formed without formation of addition complexes. The acetylides, being generally solids which are insoluble in the absorption solution as well as in the hydrocarbons, are readily recovered therefrom, for example by filtration, and are then hydrolyzed in the presence of an acid such as hydrochloric acid, to regenerate the acetylenes in substantially pure form and at the same time form the normally insoluble metal hydroxide, which may be recycled to the absorption solution.

The main reactions taking place in the above process are those represented by the generalized Equations 1 and 2 below, which represent the precipitation and the regenerations, respectively.

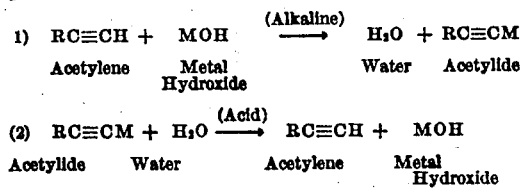

It may be noted that Equation 2 is merely the reverse of Equation 1, but the two take place under different conditions. The precipitation, Equation 1, generally requires a temperature below about 120° F., while the regeneration generally requires considerably higher temperatures. Furthermore, the precipitation requires an alkaline solution, having a pH above 7 and preferably above about 11, the higher acetylenes generally requiring a higher pH for precipitation than acetylene itself, whereas the regeneration step usually requires an acidic solution, having a pH below 7 and preferably below about 4. The desired pH values are obtained by the use of nitrogen bases and if necessary, other water-soluble strong inorganic bases such as caustic soda, in the precipitating solution, and by the use of strong acids such as hydrochloric acid in the regeneration step. With the higher acetylenes, regeneration may be accomplished with solutions of higher pH than with acetylene itself, such as ammonium chloride solutions. Certain requirements other than pH must also be met for satisfactory precipitation and regeneration, as shown below.

The invention lies in the control of the concentrations of the insoluble metal hydroxides, the nitrogen base salts, the nitrogen bases, and the strong water soluble inorganic bases in the absorption solution, to obtain the proper pH required as well as the other conditions desired for selective precipitation of acetylenes; in the control of pH and other conditions to prevent side reactions of polymerization and hydrochlorination in the acetylene regeneration step; in the combination of these steps into a workable process; and in the employment of organic nitrogen bases in these processes.

The absorption or precipitation process described above is applicable to any mixture of hydrocarbons containing acetylenes, such as cracked fractions from petroleum, shale, coal tar, and the like, but is particularly applicable to those containing the substituted acetylenes, i. e. those having more than 2 carbon atoms, such as the "C₄ acetylenes" by which term we include methyl, ethyl, and vinyl acetylenes and diacetylene, all of which have boiling points very near those of other hydrocarbons having only 4 carbon atoms, such as butanes, butenes and butadiene. The process is especially applicable to mixtures containing substituted alpha acetylenes, which have a terminal —C≡CH group, and may be represented by the structural formula RC≡CH where R is a saturated or unsaturated hydrocarbon group.

Besides cuprous hydroxide mentioned above, other metal hydroxides which are normally insoluble in water may be used, such as silver hydroxide. Both cuprous hydroxide and silver hydroxide are very insoluble in water. The presence of nitrogen bases and nitrogen base salts however, increases their solubility markedly, probably by formation of complexes such as the known copper-ammonium complexes, so that they may be present in solution in moderately high concentrations in the absorption solutions of this invention. It is also desirable in some instances to employ solutions saturated with the insoluble metal hydroxide and containing excess undissolved hydroxide. It should be realized that where the term "hydroxide" is used in connection with these metals, this includes the oxide or a hydrate of the oxide or an unknown complex as described below. Cuprous and silver compounds other than the hydroxides may be used in the process, although the hydroxides are preferred. For the selective precipitation step alone, cuprous or silver salts having almost any anion may be employed providing the pH is properly adjusted, but to provide an economical process involving also the regeneration step it is desirable that the anion of the salt be the same as that of the acid or salt employed in the regeneration step, as described below. These anions include those of strong acids such as hydrochloric, hydrobromic, nitric, and sulfuric, as well as those of weaker acids such as hydrofluoric, sulfurous, phosphoric, and carboxylic acids, such as formic, acetic, oxalic, succinic, malic, maleic, etc. When salts are employed rather than the hydroxide, however, nitrogen bases or inorganic bases must be present also in at least an equi-molal amount, so that the salt could be considered to be converted thereby to the hydroxide and thereafter react as in Equation 1.

The nitrogen bases which may be employed in the absorption step include for example tetraethylene-pentamine, morpholine, and the like.

The nitrogen base salts employed in the absorption solution preferably are salts of the nitrogen bases employed with them. Their anions may be the same as those used in the regeneration step as described above, but for the absorption step in general the salts of weak acids are preferred, the carbonates being useful, in addition to the salts of the weak acids mentioned above. The acetates are especially suitable.

The absorption solution, therefore, which contacts the hydrocarbon feed stock mixtures described above to precipitate the acetylenes according to Equation 1 above, generally contains a water-insoluble metal hydroxide (or salt), a nitrogen base, and a nitrogen base salt selected from those described in the above paragraphs, and may also contain a water-soluble strong inorganic base, such as sodium or potassium hydroxide. The concentrations of these materials should be as outlined in the following paragraphs:

In order to provide a consistent terminology herein, the absorption solutions will always be described as comprising metal hydroxides (CuOH or AgOH), nitrogen base salts (NR₃HX) and nitrogen bases (NR₃), although the same solutions could also be described as comprising metal oxides or salts, acids, and nitrogen bases. For example, a solution which would be described herein as 1M in cuprous hydroxide, 2M in ammonium acetate, and 7M in ammonia could also be described either as 0.5M in cuprous oxide (Cu₂O), 2M in acetic acid, and 9M in ammonia, or as 1M in cuprous acetate (CuCOOCH₃), 1M in ammonium acetate and 8M in ammonia, or as 0.5M in cuprous oxide, 2M in ammonium acetate, and 7M in ammonia, and this same solution could be prepared by any of the methods corresponding to these different systems of nomenclature.

The concentration of the insoluble metal hydroxide is moderate, in the range of about 0.1 to 3M, and preferably about 0.1 to 0.5M (M=molal, or mols per liter) based on the entire cuprous copper or silver content of the added hydroxide or salt. The higher concentrations permit the use of smaller amounts of absorbent solution for a given feed stock, but it has been found that concentrations which are too high may result in the formation of water-soluble addition complexes rather than insoluble acetylides. The concentration of the nitrogen base should be high, at least about 1M and preferably at least 5M. The maximum concentration of nitrogen base may be limited in some instances by its solubility in the aqueous solution under reaction conditions although many of the nitrogen bases are miscible in water in all proportions. Nitrogen bases substantially free from water may also be employed providing they will dissolve sufficient cuprous or silver salt in solution. However, in the absence of water some acetylenes form soluble addition complexes rather than insoluble acetylides with the cuprous or silver salt. The concentration of the nitrogen base salt should also be moderate, in the neighborhood of 0.2 to 5M, and preferably about 0.2 to 1M. In general, the cuprous and silver hydroxides or salts are more soluble in solutions containing high concentrations of nitrogen base and nitrogen base salt. The concentration of the nitrogen base salt should be at least as high as that of the insoluble metal hydroxide, and the concentration of the nitrogen base salt plus that of the nitrogen base should be at least double that of the copper or silver hydroxide, to permit the formation of the complexes which solubilize the hydroxides as described above, since these complexes generally contain at least two mols of nitrogen base per mol of metal. The presence of excessively large amounts of nitrogen base salts however, may prevent precipitation of acetylides, either by the formation of soluble addition complexes with the acetylenes rather than insoluble acetylides, or by promoting the hydrolysis of the acetylides. The latter action is more pronounced when the salts of strong acids are employed, so it is desirable that the absorption solution contain only a limited concentration of anions of strong acids. It has been found that the presence of sodium or potassium hydroxide is also desirable in minimizing hydrolysis of the acetylides and in maintaining the pH of the solution at the desired high value, especially when moderately high concentrations of copper or silver and nitrogen base salt are employed.

By contacting the feed stock with the absorption solutions of high pH, high nitrogen base content and moderate concentrations of cuprous or silver hydroxide and nitrogen base salts, as described above, the acetylenes present in the feed stock are absorbed therefrom and are precipitated as the acetylides according to reaction 1, while the other hydrocarbons in the feed are not absorbed or are not precipitated from the solution. Operation under pressure or in the liquid phase is generally preferred. The precipitated acetylides may be separated from the absorption solution, as by filtration, centrifuging or settling and decantation, and hydrolyzed according to Equation 2 to regenerate the acetylenes and the cuprous or silver salt or hydroxide. It is also possible merely to heat part or all of the absorption solution containing the acetylides to regenerate the acetylenes in some instances. It is desirable to keep the acetylides moist at all times to minimize explosion hazards.

The hydrolysis, or regeneration step, is usually carried out in acidic solutions of relatively low pH and in the presence of the anions of weak or strong acids or salts as described above. For this step, however, the strong acids and salts thereof are preferable, especially where acetylene itself is concerned. The concentrations of these salts or acids need not be high, although the reaction is generally accelerated to a greater extent at the higher concentrations.

The acetylene regeneration conditions must be carefully controlled since many undesired side reactions are possible. It is apparent that when acetylides are treated with water in the presence of acids there will be present in the reaction mixture acids, acetylenes, acetylides and metal salts or hydroxides. The acetylenes, especially the olefin substituted acetylenes, tend not only to polymerize in the presence of the water and acids, but to add the acids to the double bond, as in the familiar reaction by which vinyl acetylene adds hydrochloric acid to form chloroprene. According to the present invention, however, such side reactions of addition and polymerization are repressed by removing the acetylenes from the reaction mixture as formed. This may be done by adding the acetylides slowly to the boiling aqueous solution. In this mode of operation the aqueous solution is preferably a constant boiling or azeotropic solution under the reaction conditions. The temperature of the boiling acid solution may be varied, if desired, by a variation in the pressure, lower pressures resulting in lower boiling points. To facilitate rapid removal of the acetylenes as formed, an inert gas such as steam or flue gas may be bubbled through the solution.

Cyanides may also be employed in the regeneration operation, but cannot be employed in the precipitation of acetylides The following are specific examples of the process of this invention. The feed stock employed in each instance unless otherwise specified was a $C_4$ fraction from the product obtained by cracking a heavy gasoline distillate from a naphthenic California crude oil at a temperature of about 1400° F. in the presence of hot combustion gases. This feed stock consisted of about 55% butadiene, 35% butenes (iso and normal), 5% butanes, and 5% acetylenes (predominantly methyl, ethyl and vinyl).

*Example 1*

The above feed stock in the gaseous state was passed through a fritted glass plate immersed to a depth of 2 inches in an aqueous solution containing about 5% of silver nitrate and 5% of tetraethylene pentamine. This solution may be considered as 0.3M in silver hydroxide, 0.3M in nitrogen base salt (nitrate) and about 1M in nitrogen base (considering one neutralizing equivalent of the amine as one mol), and it had a pH of 11.5. A precipitate which formed immediately was found to be mixed silver acetylides, and the absorbed gases were found to be substantially free from acetylenes although substantially no butenes, butadiene or butanes were absorbed.

*Example 2*

An absorption solution having a pH of about 12 was prepared by dissolving cuprous chloride and acetic acid in an aqueous solution of morpholine containing about 50% morpholine, to obtain concentrations of copper hydroxide, morpholine hydrochloride, morpholine acetate and morpholine of approximately 0.1M, 0.1M, 0.1M and 5M, respectively. This solution was found to be capable of precipitating acetylenes quantitatively from the above feed stock at room temperature in the liquid or vapor phase. Upon settling, decanting and heating the acetylide slurry, a small quantity of dissolved butadiene was released first, then substantially pure acetylenes.

Instead of regenerating by settling and decanting, as just described, it was found possible to heat the entire solution containing the precipitated acetylides. By this method, a clear amber colored solution remained after the acetylenes were driven off, and this solution when cooled, was essentially as effective as the original absorption solution in precipitating acetylenes. When cooled, the amber color of the solution gradually turned back to green, but both the green and the amber solutions were effective absorption or precipitation solutions.

Although in the above examples a $C_4$ feed stock was employed, similar results may be obtained with other hydrocarbon feed stocks, such a $C_5$ fraction containing isoprene, cyclopentadiene, pentenes, propyl acetylene, and other 5 carbon atom hydrocarbons, or a $C_6$ fraction, or higher fractions. Pure diolefins such as butadiene, isoprene, cyclopentadiene, etc. may also be produced by employing a combination process in which relatively more saturated hydrocarbons such as paraffins and mono-olefins are separated from the hydrocarbon mixture in the first stage leaving only acetylenes and diolefins, which are subsequently treated as above to separate the acetylenes, leaving pure diolefins. For example, a $C_4$ fraction such as used in the above examples may be treated by a solvent extraction process or an azetropic distillation process to separate a fraction containing only butadiene and acetylenes. The latter mixture may then be treated by the process of this invention to separate the acetylenes, leaving pure butadiene.

As an extension of the present invention, particularly where copper or silver concentrations of 2 to 4M are employed, it has been found that the absorption solution may act as a selective solvent, especially at sub-atmospheric temperatures, and butadiene and acetylenes may both be removed from the gaseous mixture selectively without removing substantial amounts of butenes or butanes. Under certain conditions either the acetylenes or the butadiene may be precipitated as an addition complex. Upon subsequent dilution of the absorption solution, the acetylenes may be precipitated as acetylides, while the butadiene is held in solution or partly released. Upon warming of the diluted solution the butadiene may be regenerated without decomposing the acetylide, and subsequently the acetylide may be composed as described above.

Also the acetylides may be allowed to settle from the diluted solution, as in Example 2 above, and the clear supernatant solution decanted. The butadiene would be recovered free from acetylenes by heating the decanted clear solution, and the acetylenes recovered relatively free from butadiene from the residual slurry as described above.

Cupric ion may be present with the cuprous to an appreciable extent, such as a few percent, in the above solutions, although too much cupric ion may prevent acetylide precipitation. It is advantageous, therefore, in many instances to employ a reducing agent with the above solutions, such as for example metallic copper, stannous chloride, or anti-oxidants. If desired, inert solvents having selective solvent action for butadiene may be included in the absorption solution. This process may also be carried out with acetylenes, diolefins and other hydrocarbons other than the specific hydrocarbons mentioned above.

Other modifications of this invention may be made by those skilled in the art without departing from the spirit and scope of the following claims.

We claim:

1. A process for the separation of acetylenes from a hydrocarbon mixture containing acetylenes and diolefines, which comprises contacting said mixture with an aqueous absorption solution having a pH greater than 7 and containing an organic nitrogen base selected from the class consisting of morpholine and tetraethylene pentamine in a concentration greater than about 1 M, a salt of said nitrogen base other than the cyanide in a concentration not greater than about 1.0 M, and a metal hydroxide in a concentration not greater than about 0.5 M, thereby precipitating a reaction product of said metal and said acetylenes without substantially affecting said diolefins, and separating said reaction product from unreacted hydrocarbons.

2. A process according to claim 1 in which regeneration of the acetylenes is carried out by adding the solid reaction product slowly to a boiling azeotropic solution comprising hydrochloric acid and water, removing the acetylenes by vaporization as formed.

3. A process for the separation of substituted alpha acetylenes from a hydrocarbon mixture containing such acetylenes and diolefins, which comprises contacting said mixture with an aqueous absorption solution having a pH greater than 7 and containing an organic nitrogen base selected from the class consisting of morpholine and tetraethylene pentamine in a concentration greater than about 1 M, a salt of said nitrogen base other than the cyanide in a concentration not greater than about 1.0 M, and a hydroxide of a metal selected from the class consisting of monovalent copper and silver in a concentration not greater than about 0.5 M, thereby precipitating a reaction product of said metal and said acetylenes without substantially affecting said diolefins, and separating said reaction product from unreacted hydrocarbons.

4. A process according to claim 3 in which the hydroxide is cuprous hydroxide.

5. A process according to claim 3 in which the nitrogen base salt is selected from the class consisting of chlorides and acetates.

6. A process according to claim 3 in which the absorption solution has a pH above about 11.

7. A process according to claim 3 in which the concentration of the metal hydroxide is about 0.1 to 0.5 M, the concentration of the nitrogen base is greater than about 5 M, and the concentration of the nitrogen base salt is about 0.2 to 1.0 M.

8. A process according to claim 3 in which the absorption solution is saturated with metal hydroxide, and an excess of solid metal hydroxide is present.

9. A process for separating acetylenes from a hydrocarbon mixture containing $C_4$ acetylenes and butadiene, which comprises contacting said mixture with an aqueous absorption solution having a pH greater than 7 and containing an organic nitrogen base selected from the class consisting of morpholine and tetraethylene pentamine in a concentration greater than about 1 M, a salt of said nitrogen base other than the cyanide in a concentration not greater than about 1.0 M, and a hydroxide of a metal selected from the class consisting of monovalent copper and silver in a concentration not greater than about 0.5 M, thereby precipitating a reaction product of said metal and said acetylenes without substantially affecting said butadiene, and separating said reaction product from unreacted hydrocarbons.

10. A process for the separation of acetylenes from a hydrocarbon mixture containing acetylenes and diolefins, which comprises contacting said mixture with an aqueous absorption solution having a pH greater than 7 and containing an organic nitrogen base selected from the class consisting of morpholine and tetraethylene pentamine in a concentration greater than about 1 M, a salt of said nitrogen base other than the cyanide in a concentration not greater than about 1.0 M, and a metal hydroxide in a concentration not greater than about 0.5 M, thereby precipitating a reaction product of said metal and said acetylenes without substantially affecting said diolefins, separating said reaction product from unreacted hydrocarbons, and regenerating the acetylenes therefrom by treatment with a hot aqueous solution having a pH below 7.

11. A process for the separation of substituted alpha acetylenes from a hydrocarbon mixture containing such acetylenes and diolefins, which comprises contacting said mixture with an aqueous absorption solution having a pH greater than 7 and containing morpholine in a concentration greater than about 1 M, a morpholine salt other than the cyanide, and a hydroxide of a metal selected from the class consisting of monovalent copper and silver, thereby forming a reaction product of said metal and said acetylenes, and separating said reaction product from unreacted hydrocarbons.

12. A process for the removal of acetylenes from hydrocarbon mixtures containing same in admixture with diolefins and mono-olefins without substantially affecting said diolefins, which comprises contacting said mixtures with an aqueous absorption solution containing an organic nitrogen base selected from the class consisting of morpholine and tetraethylene pentamine in a concentration greater than about 1 M, a salt of said nitrogen base other than the cyanide in a concentration not greater than about 1.0 M, a water soluble strong inorganic base, and a hydroxide of a metal from the class consisting of monovalent copper and silver in a concentration not greater than about 0.5 M.

13. A process for the separation of the $C_4$ acetylenes from a hydrocarbon mixture of the same boiling range and also containing butadiene, which comprises contacting said mixture with an aqueous absorption solution about 0.1 M in copper hydroxide, about 0.1 M in morpholine acetate, about 0.1 M in morpholine hydrochloride, and about 5 M in morpholine, at a temperature below about 120° F., thereby forming a solid copper-containing reaction product with said acetylenes, separating the spent absorption solution containing said solid reaction product from unreacted hydrocarbons, and heating said solid reaction product together with spent absorption solution to regenerate the acetylenes.

14. A process for separating acetylenes and conjugated diolefins from a hydrocarbon mixture containing same, which comprises contacting said mixture with an aqueous absorption solution having a pH greater than 7 and containing tetraethylene pentamine in a concentration greater than about 1 M, a salt of said nitrogen base other than the cyanide in a concentration not greater than about 1.0 M, and a hydroxide of a metal from the class consisting of monovalent copper and silver in a concentration not greater than about 0.5 M, thereby precipitating a solid reaction product of said metal and said acetylenes without substantially affecting said diolefins, and a spent absorption solution containing dissolved diolefins, separating said solid reaction product and said spent solution from unreacted hydrocarbons and from each other, hydrolyzing said solid reaction product to regenerate the acetylenes, and heating said spent solution to liberate diolefins.

15. A process for separating acetylenes and conjugated diolefins from a hydrocarbon mixture consisting of a $C_4$ fraction containing butadiene and methyl, ethyl and vinyl acetylenes, which comprises contacting said mixture with an aqueous absorption solution having a pH greater than 7 and containing morpholine in a concentration greater than about 1 M, a morpholine salt other than the cyanide, and a hydroxide of a metal selected from the class consisting of monovalent copper and silver, thereby forming a solid reaction product of said metal and said acetylenes, and a spent absorption solution containing dissolved diolefins, separating said solid reaction product and said spent solution from unreacted hydrocarbons and from each other, hydrolyzing said solid reaction product to regenerate the acetylenes, and heating said spent solution to liberate diolefins.

16. A process for the separation of substituted alpha acetylenes from a hydrocarbon mixture consisting of such acetylenes in admixture with diolefins and relatively less unsaturated hydrocarbon of similar boiling points, which comprises separating from said mixture a fraction containing only acetylenes and diolefins, contacting said fraction with an aqueous absorption solution having a pH greater than 7 and containing an organic nitrogen base selected from the class consisting of morpholine and tetraethylene pentamine in a concentration greater than about 1 M, a salt of said nitrogen base other than the cyanide in a concentration not greater than about 1.0 M, and a metal hydroxide in a concentration not greater than about 0.5 M, thereby precipitating a reaction product of said metal and said acetylenes without substantially affecting said diolefins, and separating said reaction product from the unreacted substantially pure diolefins.

17. A process for the separation of $C_4$ acetylenes from a hydrocarbon mixture consisting of such acetylenes, butadiene, and relatively less unsaturated hydrocarbons of approximately the same boiling points, which comprises treating said mixture with a selective solvent to obtain a fraction containing only said acetylenes and butadiene, contacting said fraction with an aqueous absorption solution having a pH greater than 7 and containing an organic nitrogen base selected from the class consisting of morpholine and tetraethylene pentamine in a concentration greater than about 1 M, a salt of said nitrogen base other than the cyanide in a concentration not greater than about 1.0 M, and a hydroxide of a metal selected from the class consisting of monovalent copper and silver in a concentration not greater than about 0.5 M, thereby precipitating a reaction product of said metal and said acetylenes without substantially affecting said butadiene, and separating said reaction product from the unreacted substantially pure butadiene.

THOMAS F. DOUMANI.
DAVIS A. SKINNER.

REFERENCES CITED

The following references are of record in the file of this patent:

UNITED STATES PATENTS

| Number | Name | Date |
|---|---|---|
| 1,083,165 | Webel | Dec. 30, 1913 |
| 1,771,350 | Ramage | July 22, 1930 |
| 2,237,353 | Lange | Apr. 8, 1941 |
| 2,316,536 | Fuchs | Apr. 13, 1943 |
| 2,322,281 | Craig | June 22, 1943 |
| 2,370,809 | Morrell et al. | Mar. 6, 1945 |
| 2,388,928 | Morrell et al. | Nov. 13, 1945 |

FOREIGN PATENTS

| Number | Country | Date |
|---|---|---|
| 424,843 | Great Britain | Mar. 1, 1935 |